United States Patent [19]
Stemler et al.

[11] Patent Number: 5,980,410
[45] Date of Patent: Nov. 9, 1999

[54] ELECTRO-MECHANICAL TRANSMISSION

[75] Inventors: Eric D. Stemler, Peoria; Stephen C. Garnett, Princeville, both of Ill.

[73] Assignee: Caterpillar Inc., Peoria, Ill.

[21] Appl. No.: 09/161,975

[22] Filed: Sep. 28, 1998

[51] Int. Cl.⁶ ........................................ F16H 3/72
[52] U.S. Cl. ........................................ 475/5; 477/2
[58] Field of Search .................. 475/2, 3, 5, 8; 477/2, 5

[56] References Cited

U.S. PATENT DOCUMENTS

| | | | |
|---|---|---|---|
| 5,146,812 | 9/1992 | Nikolaus et al. | 74/858 |
| 5,159,855 | 11/1992 | Nikolaus et al. | 74/850 |
| 5,343,779 | 9/1994 | Nikolaus et al. | 74/733.1 |
| 5,558,588 | 9/1996 | Schmidt | 475/5 |
| 5,558,589 | 9/1996 | Schmidt | 475/5 |
| 5,571,058 | 11/1996 | Schmidt | 475/5 |
| 5,669,842 | 9/1997 | Schmidt | 475/5 |
| 5,730,676 | 3/1998 | Schmidt | 475/5 |
| 5,799,744 | 9/1998 | Yamaguchi et al. | 475/5 X |
| 5,844,342 | 12/1998 | Miyatani et al. | 475/5 X |
| 5,873,800 | 2/1999 | Maslow et al. | 475/5 X |
| 5,904,631 | 5/1999 | Morisawa et al. | 475/5 |

*Primary Examiner*—Khoi Q. Ta
*Attorney, Agent, or Firm*—Calvin E. Glastetter

[57] ABSTRACT

A electro-mechanical transmission includes an electrical section and a mechanical transmission to provide a continuously variable power flow through the transmission. The mechanical transmission includes a planetary gearing mechanism having three planetary gear sets and five members which interact with the electrical section and a gear change mechanism to provide a continuously variable output speed.

20 Claims, 11 Drawing Sheets

ELECTRO-MECHANICAL TRANSMISSION

TECHNICAL FIELD

This invention relates generally to an electro-mechanical transmission and more particularly to a transmission having a planetary gearing mechanism having five members and three planetary gear sets.

BACKGROUND ART

In a machine, such as a wheel loader or a track type tractor, for example, an engine supplies power for propelling the machine in the forward or reverse directions as well as supply power for machine implements. A transmission is coupled to the engine and transmits power from the engine to the drive train to propel the machine. It is desirable to utilize a continuously variable transmission and manage the transmission ratio to hereby save engine power for the implements and also to provide a continuously variable power flow through the transmission to improve machine productivity. Because machines operate at relatively low speeds and in cyclical work routines, there is a need to control speed precisely and to be infinitely adjustable throughout the full range of the transmission. One of the problems associated with such an arrangement is to provide an electro-mechanical transmission that will operate at high efficiencies over a wide variety of operating conditions.

The present invention is directed to overcoming one or more of the problems as set forth above.

DISCLOSURE OF THE INVENTION

In one aspect of the present invention a electro-mechanical transmission having an input and a output is provided. The electro-mechanical transmission includes a first and a second motor/generator and a planetary gearing mechanism. A first member of the planetary gearing mechanism is connected to one of the motor/generator and is selectively connected to the output. A second member is selectively connected to the output. A third member is connected to the input. A fourth member is selectively connected to the output. A fifth member is connected to the other of the motor/generator. A gear change mechanism selectively connects the planetary gearing mechanism to the output for achieving the various gear ratios.

BEST MODE FOR CARRYING OUT THE INVENTION

Figure 1:
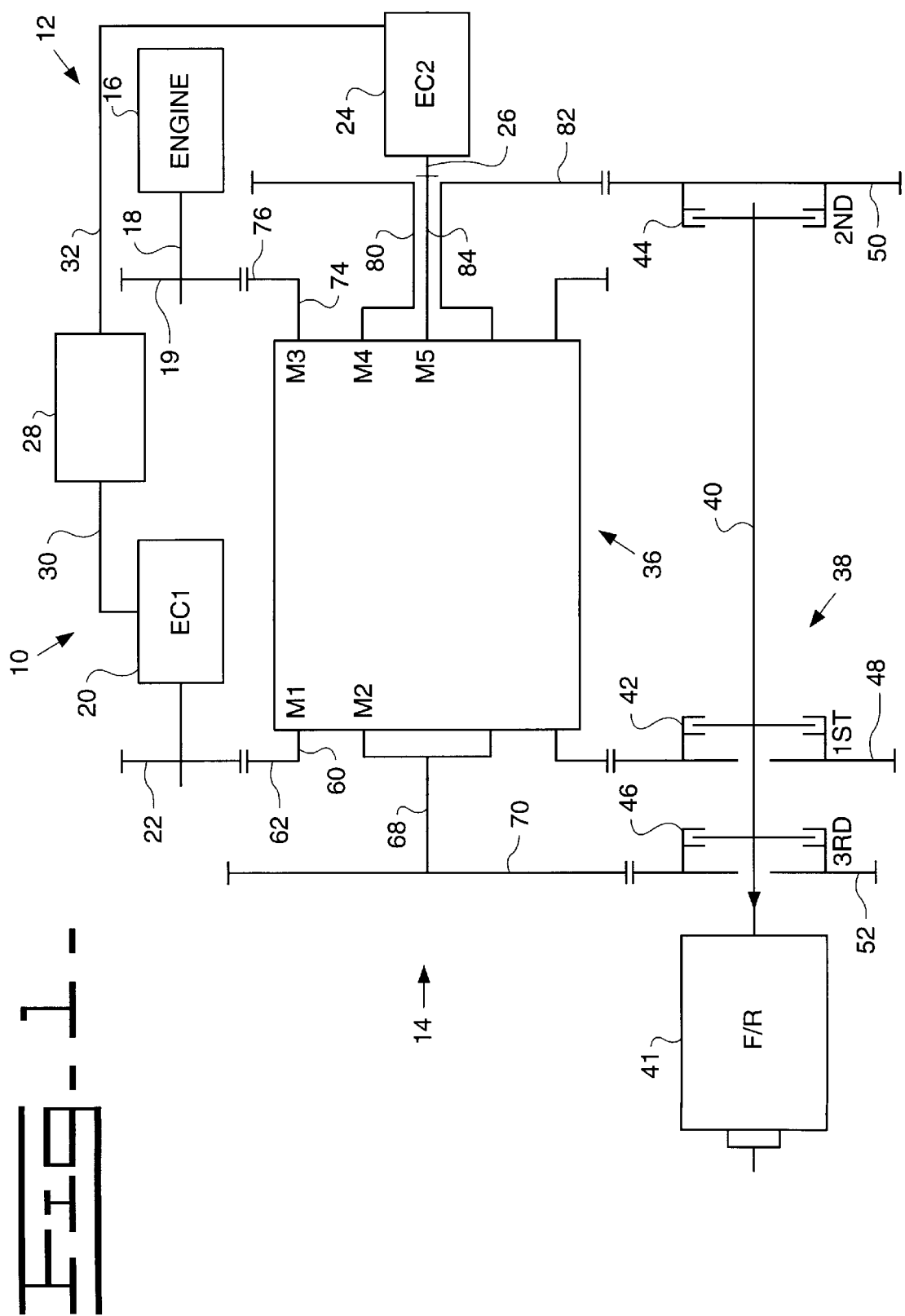
FIG. 1 is a schematic view of a electro-mechanical transmission showing the present invention of five members of a planetary gearing mechanism.

Referring to FIG. 1, a electro-mechanical transmission 10 includes a electric section 12 and a mechanical transmission 14 which interact to propel a machine, not shown. The electro-mechanical transmission provides the structure to distribute input power from a source of power, such as an engine 16, to an output. The engine 16 has a output shaft 18 having a gear 19. The electric section 12 includes a first motor/generator 20 having a gear 22 connected to the mechanical transmission 14, a second motor/generator 24 having a shaft 26 connected to the mechanical transmission 14, and a controller 28 electrically connected to the motors/generators 20,24 by electrical cables 30,32. The controller 28 controls the speed and direction of the motors/generators 20,24 and also controls when to change between motor or generator.

The mechanical transmission 14 includes a planetary gearing mechanism 36 and a gear change mechanism 38 having an output shaft 40. The output shaft 40 is connected to a forward/reverse mechanism 41 for controlling machine direction. The gear change mechanism 38 controls the ratio of the transmission by engagement of a first clutch 42, a second clutch 44 or a third clutch 46 for selectively connecting a respective gear 48,50,52 to the output shaft 40. A first member 60 of the planetary gearing mechanism 36 includes a gear 62 which is drivingly connected to the gear 22 of the first motor/generator 20 and is also drivingly connected to the gear 48 of the gear change mechanism 38. The first clutch 42 selectively connects the gear 48 to the output shaft 40 to achieve a first gear ratio. A second member 68 of the planetary gearing mechanism 36 includes a gear 70 which is drivingly connected to the gear 52 of the gear change mechanism 38. The third clutch 46 selectively connects the gear 52 to the output shaft 40 to achieve a third gear ratio. A third member 74 of the planetary gearing mechanism 36 includes a gear 76 drivingly connected to the gear 19 of the engine 16. A fourth member 80 of the planetary gearing mechanism 36 includes a gear 82 drivingly connected to the gear 50 of the gear change mechanism 38. The second clutch 44 selectively connects the gear 50 to the output shaft 40 to achieve a second gear ratio. A fifth member 84 of the planetary gearing mechanism 36 is drivingly connected to the output shaft 26 of the second motor/generator 24. The output shaft 40 of the gear change mechanism 38 is connected to the conventional directional mechanism 41 to allow the machine to move in a forward or reverse direction. The members 60,68,74,80,84 each comprises one or more elements of the planetary gearing mechanism 36 and any associated gears which are connected together to function as one member.

The directional mechanism 41 is connected to the output shaft 40 and is actuated, in a known manner, to propel the machine in a forward or reverse direction.

Reference numerals of components previously described will be repeated in subsequent drawing figures.

Figure 2:
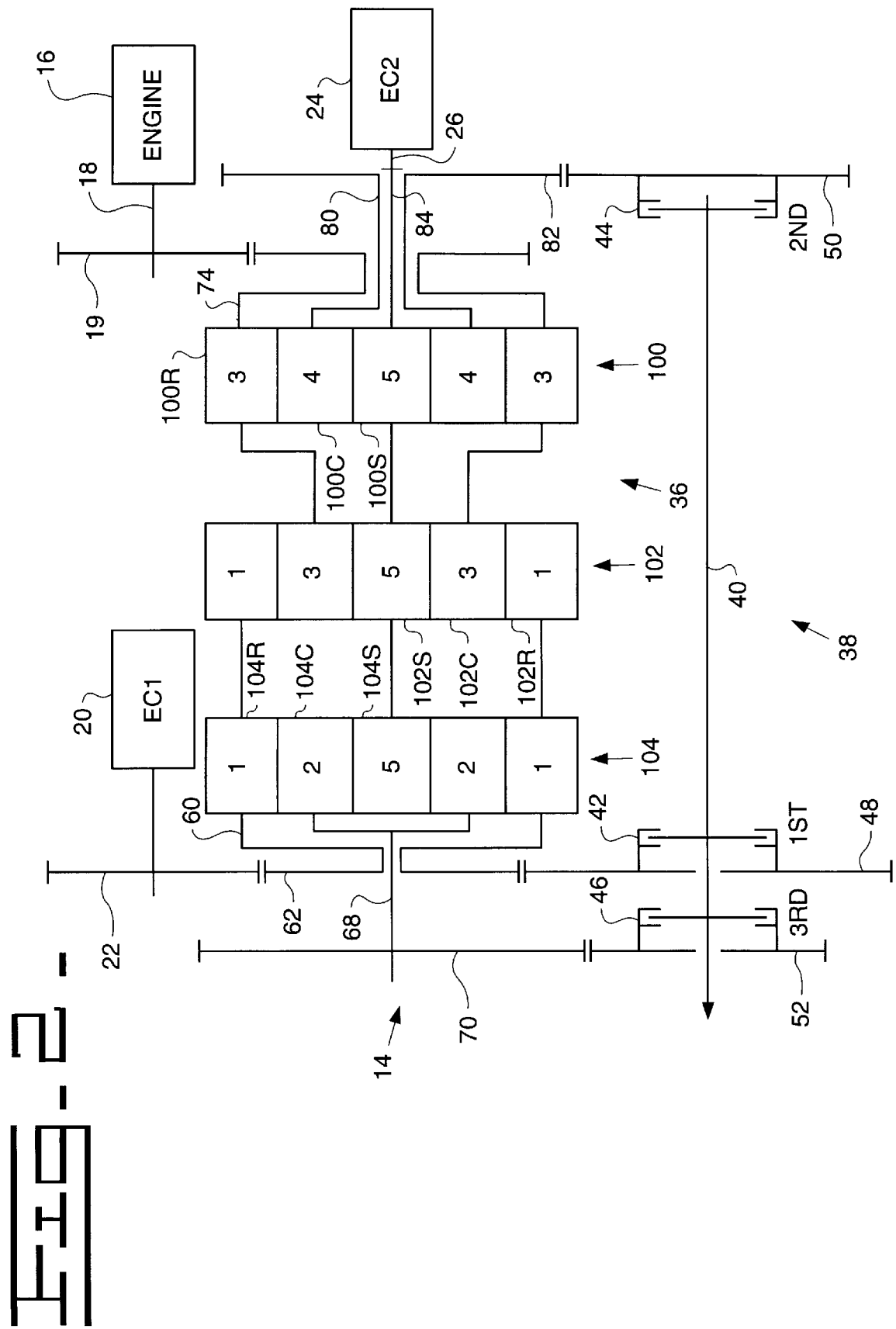
FIG. 2 is a schematic view of a electro-mechanical transmission showing the present invention showing the five members of the planetary gearing mechanism.

Referring to FIG. 2 the planetary gearing mechanism 36 includes a first planetary gear set 100, a second planetary gear set 102 and a third planetary gear set 104. Each planetary gear set 100,102,104 includes elements such as a sun gear, a carrier having planet gears, a ring gear. The first planetary gear set 100 includes a son gear 100S, a carrier 100C and a ring gear 100R. The second planetary gear set 102 includes a sun gear 102S, a carrier 102C and a ring gear 102R. The third planetary gear set 104 includes a sun gear 104S, a carrier 104C and a ring gear 104R.

The first member 60 includes the ring gears 102R,104R of the first and second planetary gear sets 102,104 for rotation as a unit. The first member 60 is connected to the gear 62, which is meshed, with the gear 22 of the first motor/generator and the gear 62 also meshes with gear 48 of the gear change mechanism 38. The gear 48 is selectively connectable to the output shaft 40 by engagement of the first clutch 42. The second member 68 includes the carrier 104C of the third planetary gear set 104 for rotation as a unit. The second member 68 is connected to the gear 70, which meshes with the gear 52 of the gear change mechanism 38. The gear 52 is selectively connectable to the output shaft 40 by engagement of the third clutch 46. The third member 74 includes the ring gear 100R of the first planetary gear set 100 and the carrier 102C of the second planetary gear set 102 for rotation as a unit. The third member 74 is connected to the gear 76 meshed with the engine driven gear 19. The fourth member 80 includes the carrier 100C of the first planetary gear set 100. The fourth member 80 is connected to the gear 82 that meshes with the gear 50 of the gear change mechanism 38. The gear 50 is selectively connectable to the output shaft 40 by engagement of the second clutch 44. The fifth member 84 includes the sun gears 100S,102S,104S of the first, second, and third planetary gear sets 100,102,104. The fifth member 84 is connected to the shaft 26 of the second motor/generator 24. The gear change mechanism 38 is shown as having a three speed ratios. Although clutches are shown, it is recognized that other means, such as shift collars, could be used to change gear ratios without departing from the scope of the invention.

Figure 3:
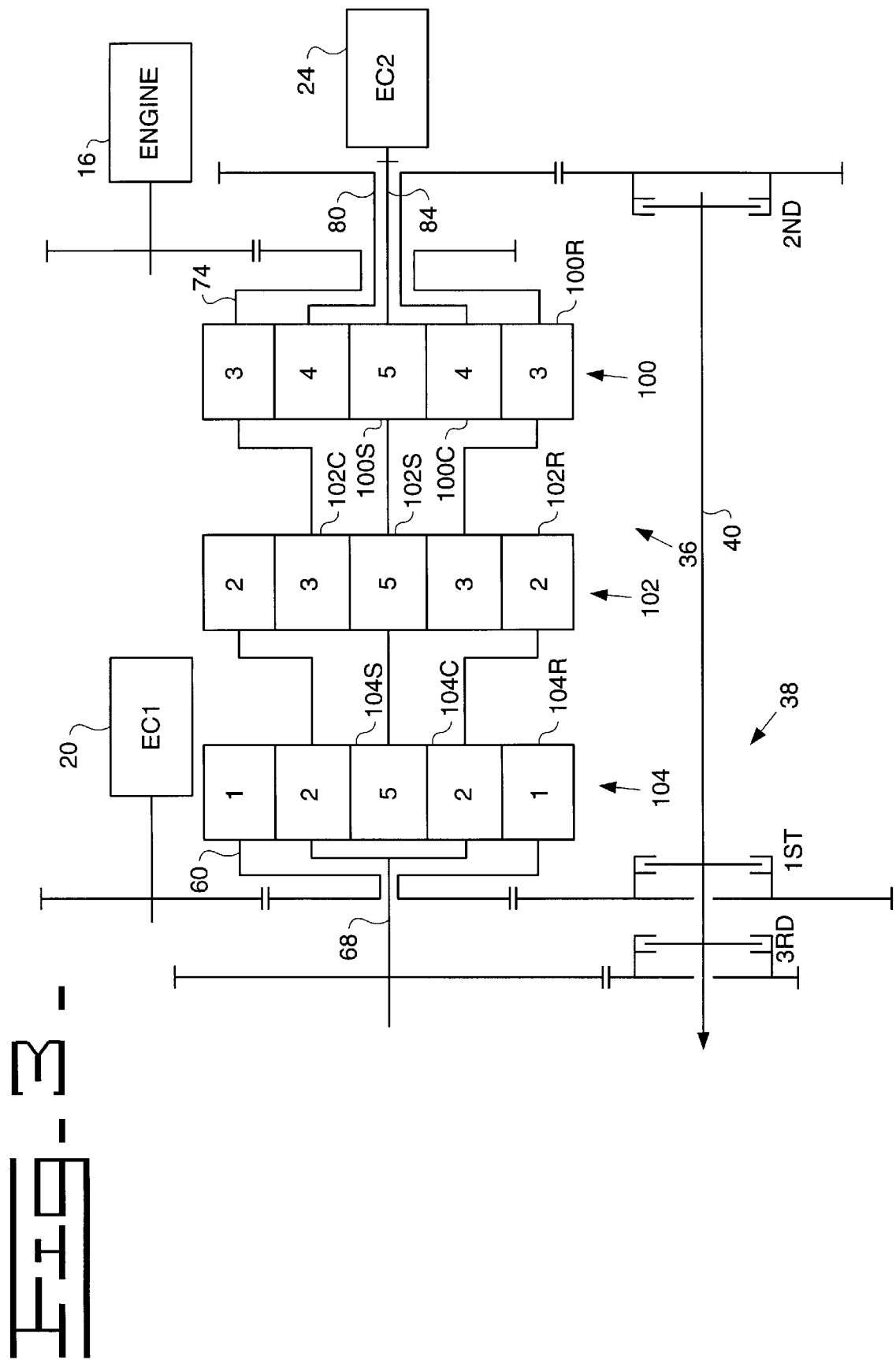
FIG. 3 is a schematic view of an alternate transmission arrangement.

Referring to FIG. 3, the first member 60 of the planetary gearing mechanism 36 includes the ring gear 104R of the third planetary gear set 104. The first member 60 is connected to the first motor/generator 20 and selectively connected to the output shaft 40 of the gear change mechanism 38. The second member 68 of the planetary gearing mechanism 36 includes the ring gear 102R of the second planetary gear set 102 and the carrier 104C of the third planetary gear set 104. The second member 68 is selectively connected to the output shaft 40 of the gear change mechanism 38. The third member 74 of the planetary gearing mechanism 36 includes the ring gear 100R of the first planetary gear set 100 and the carrier 102C of the second planetary gear set 102. The third member 74 is connected to the engine 16. The fourth member 80 of the planetary gearing mechanism 36 includes the carrier 100C of the first planetary gear set 100. The fourth member 80 is selectively connected to the output shaft 40 of the gear change mechanism 38. The fifth member 84 includes the sun gears 100S,102S,104S of the first, second, and third planetary gear sets 100,102,104. The fifth member 84 is connected to the second motor/generator 24. The gear change mechanism 38 is shown has having three speed ratios.

Figure 4:
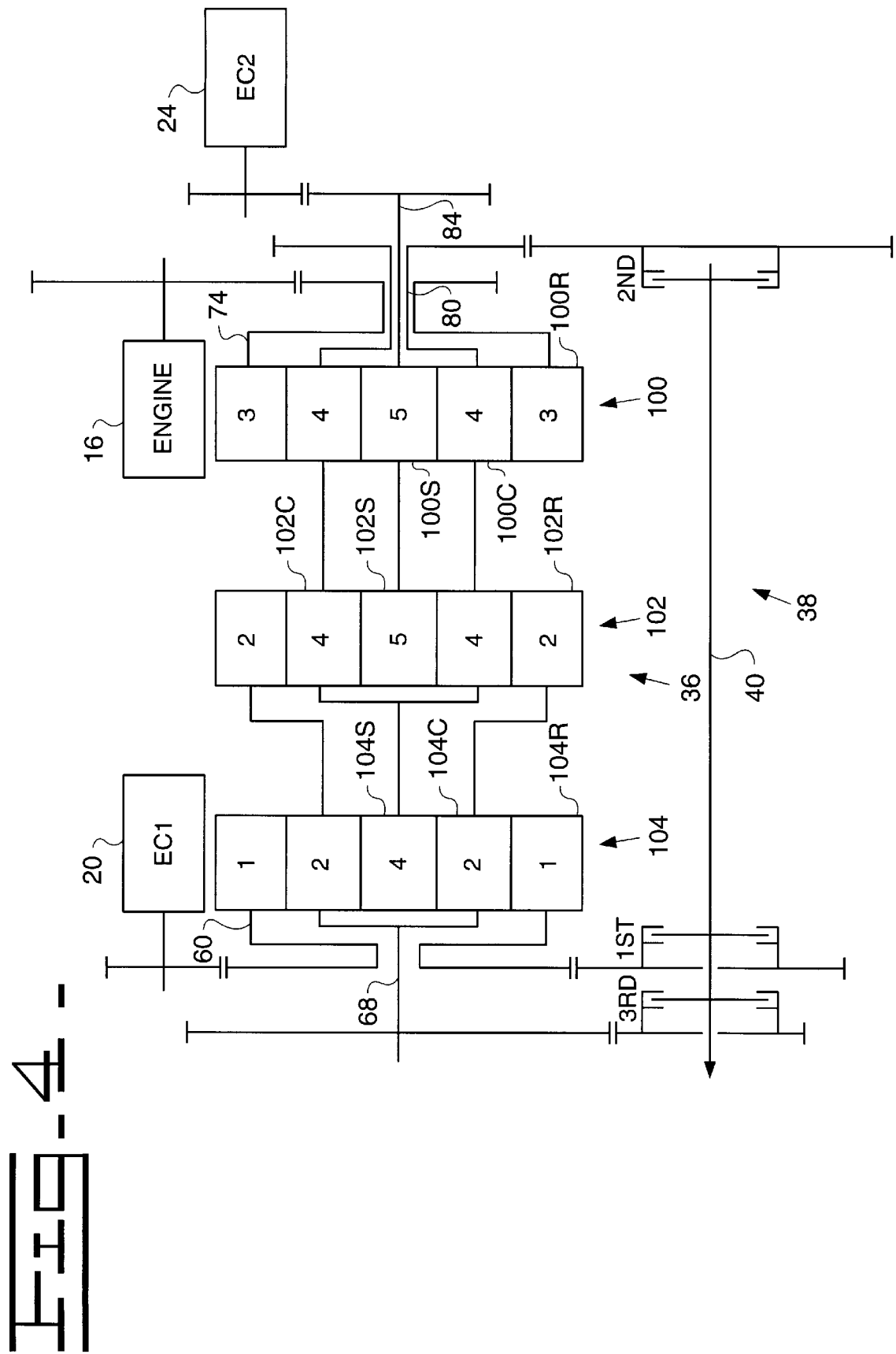
FIG. 4 is a schematic view of an alternate transmission arrangement.

Referring to FIG. 4, the first member 60 of the planetary gearing mechanism 36 includes the ring gear 104R of the third planetary gear set 104. The first member 60 is connected to the first motor/generator 20 and is selectively connected to the output shaft 40 of the gear change mechanism 38. The second member 68 of the planetary gearing mechanism 36 includes the ring gear 102R of the second planetary gear set 102 and the carrier 104C of the third planetary gear set 104. The second member 68 is selectively connected to the output shaft 40 of the gear change mechanism 38. The third member 74 of the planetary gearing mechanism 36 includes the ring gear 100R of the first planetary gear set 100. The third member 74 is connected to the engine 16. The fourth member 80 of the planetary gearing mechanism 36 includes the carriers 100C,102C of the first and second planetary gear sets 100,102 and the sun gear 104S of the third planetary gear set 104. The fourth member 80 is selectively connected to the output shaft 40 of the gear change mechanism 38. The fifth member 84 includes the sun gears 100S,102S of the first and second planetary gear sets 100,102. The fifth member is connected to the second motor/generator 24. The gear change mechanism 38 is shown has having three speed ratios.

Figure 5:
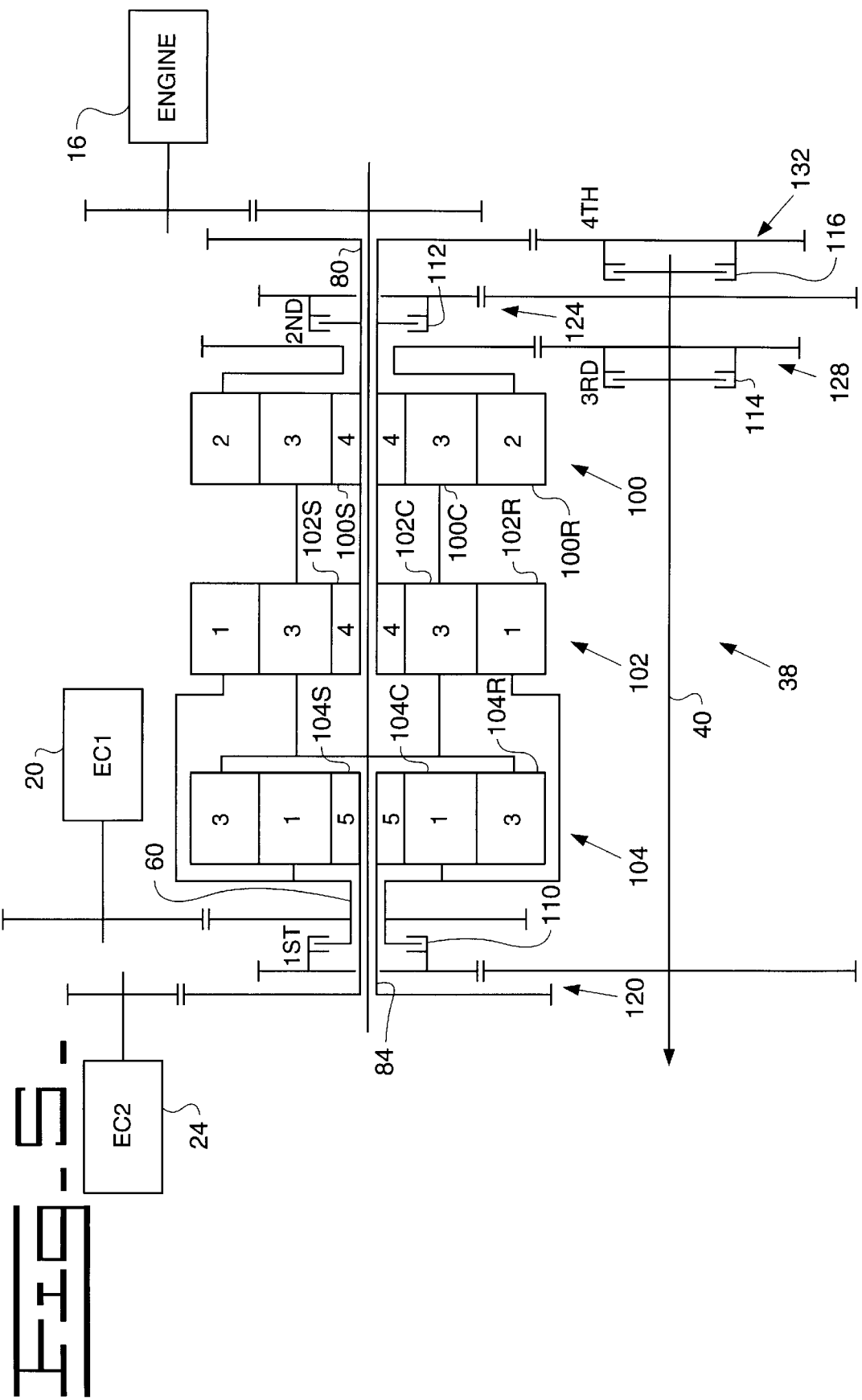
FIG. 5 is a schematic view of an alternate transmission arrangement.

Referring to FIG. 5, the first member 60 includes the ring gear 102R of the second planetary gear set 102 and the carrier 104C of the third planetary gear set 104. The first member 60 is connected to the first motor/generator 20 and is selectively connectable to the output shaft 40 of the gear change mechanism 38. The second member 68 includes the ring gear 100R of the first planetary gear set 100. The second member 68 is selectively connectable to the output shaft 40 of the gear change mechanism 38. The third member 74 includes the carriers 100C,102C of the first and second planetary gear sets 100,102 and the ring gear 104R of the third planetary gear set 104. The third member is connected to the engine 16. The fourth member 80 includes the sun gears 100S,102S of the first and second planetary gear sets 100,102. The fifth member 84 includes the sun gear 104S of the third planetary gear set 104. The fifth member is connected to the second motor/generator 24.

The gear change mechanism 38 includes a first clutch 110, a second clutch 112, a third clutch 114, and a fourth clutch 116. The first clutch 110 selectively connects the first member 60, through an associated gear train 120, to the output shaft 40 for providing a first gear ratio. The second clutch 112 selectively connects the fourth member 80, through an associated gear train 124, to the output shaft 40 for providing a second gear ratio. The third clutch 114 selectively connects the second member 68, through an associated gear train 128, to the output shaft 40 for providing a third gear ratio. The fourth clutch 116 selectively connects the fourth member 80, through an associated gear train 132, to the output shaft for providing a fourth gear ratio.

Figure 6:
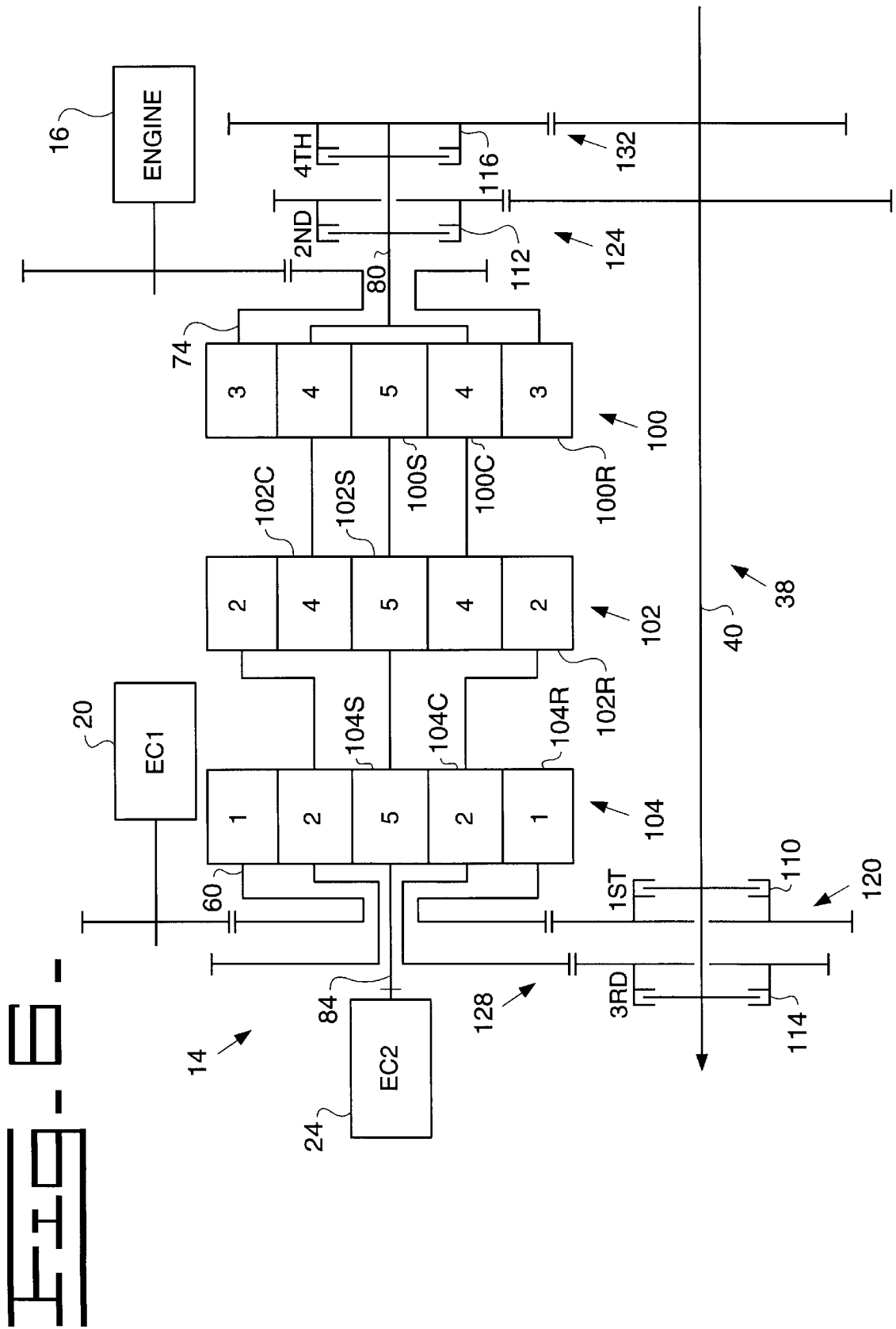
FIG. 6 is a schematic view of an alternate transmission arrangement.

Referring to FIG. 6, the first member 60 includes the ring gear 104R of the third planetary gear set 104. The first member is connected to the first motor/generator 20 and is selectively connectable to the output shaft 40 of the gear change mechanism 38 through the first clutch 110 and the gear train 120. The second member 68 includes the ring gear 102R of the second planetary gear set 102 and the carrier 104C of the third planetary gear set 104. The second member 68 is selectively connectable to the output shaft 40 of the gear change mechanism 38 through the third clutch 114 and the gear train 128. The third member 74 includes the ring gear 100R of the first planetary gear set 100. The third member 74 is connected to the engine 16. The fourth member 80 includes the carriers 100C,102C of the first and second planetary gear sets 100,102. The fourth member 80 is selectively connectable to the output shaft 40 through the second clutch 112 and the gear train 124. The fourth member 80 is also selectively connectable to the output shaft 40 through the fourth clutch 116 and the gear train 132. The fifth member 84 includes the sun gears 100S,102S,104S of the first, second and third planetary gear sets 100,102,104. The fifth member 84 is connected to the second motor/generator 24.

Figure 7:
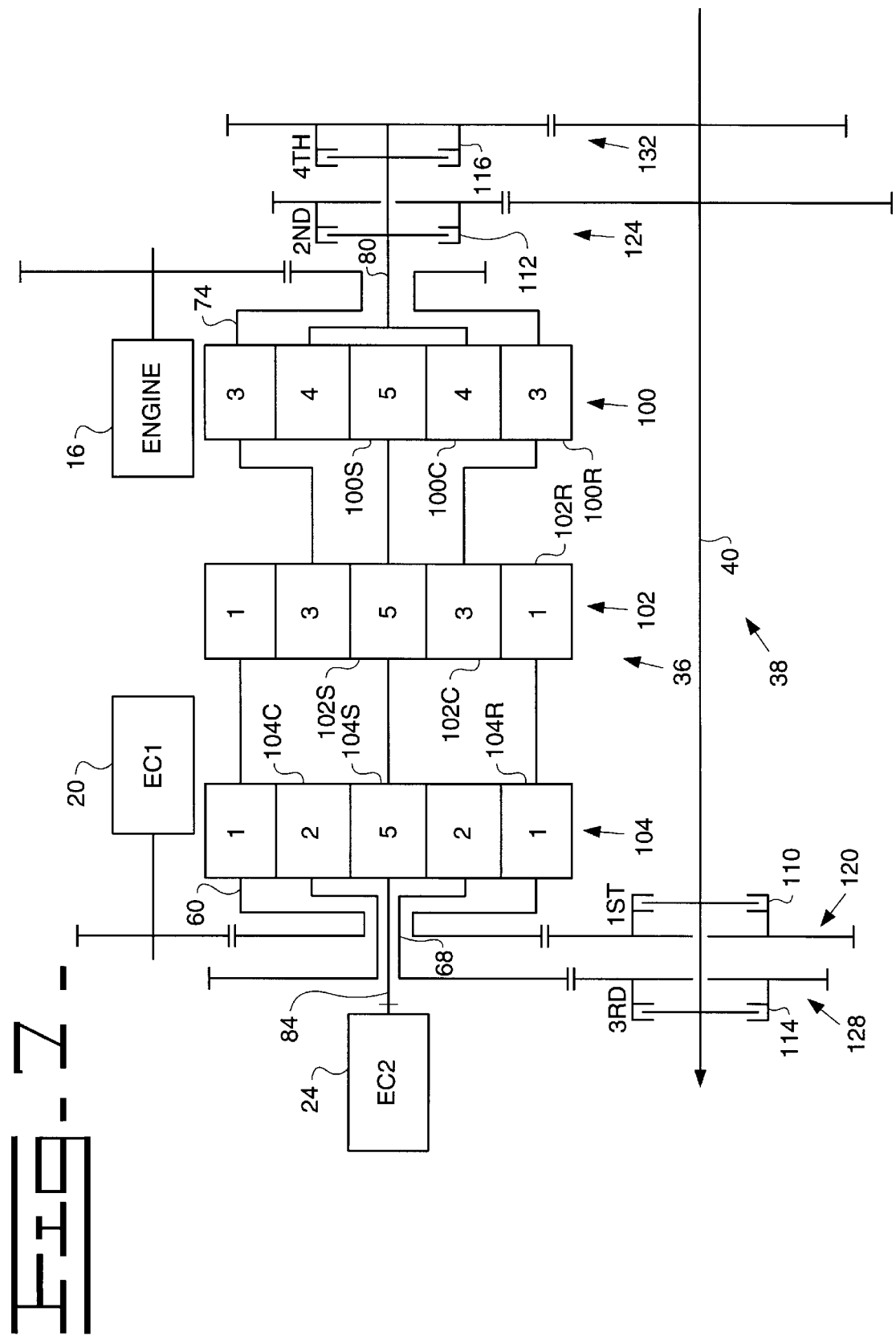
FIG. 7 is a schematic view of an alternate transmission arrangement.

Referring to FIG. 7, the first member 60 includes the ring gears 102R,104R of the second and third planetary gear sets 102,104. The first member 60 is connected to the first motor/generator 20 and is also selectively connectable to the output shaft 40 of the gear change mechanism 38 through the first clutch 110 and the gear train 120. The second member 68 includes the carrier 104C of the third planetary gear set 104. The second member 68 is selectively connectable to the output shaft 40 through the third clutch 114 and the gear train 128. The third member 74 includes the ring gear 100R of the first planetary gear set 100 and the carrier 102C of the second planetary gear set 102. The third member 74 is connected to the engine 16. The fourth member 80 includes the carrier 100C of the first planetary gear set 100. The fourth member 80 is selectively connectable to the output shaft 40 through the second clutch 112 and the gear train 124. The fourth member is also selectively connectable to the output shaft 40 through the fourth clutch 116 and the gear train 132. The fifth member 84 includes the sun gears 100S,102S,104S of the first, second and third planetary gear sets 100,102,104. The fifth member 84 is connected to the second motor/generator 24.

Figure 8:
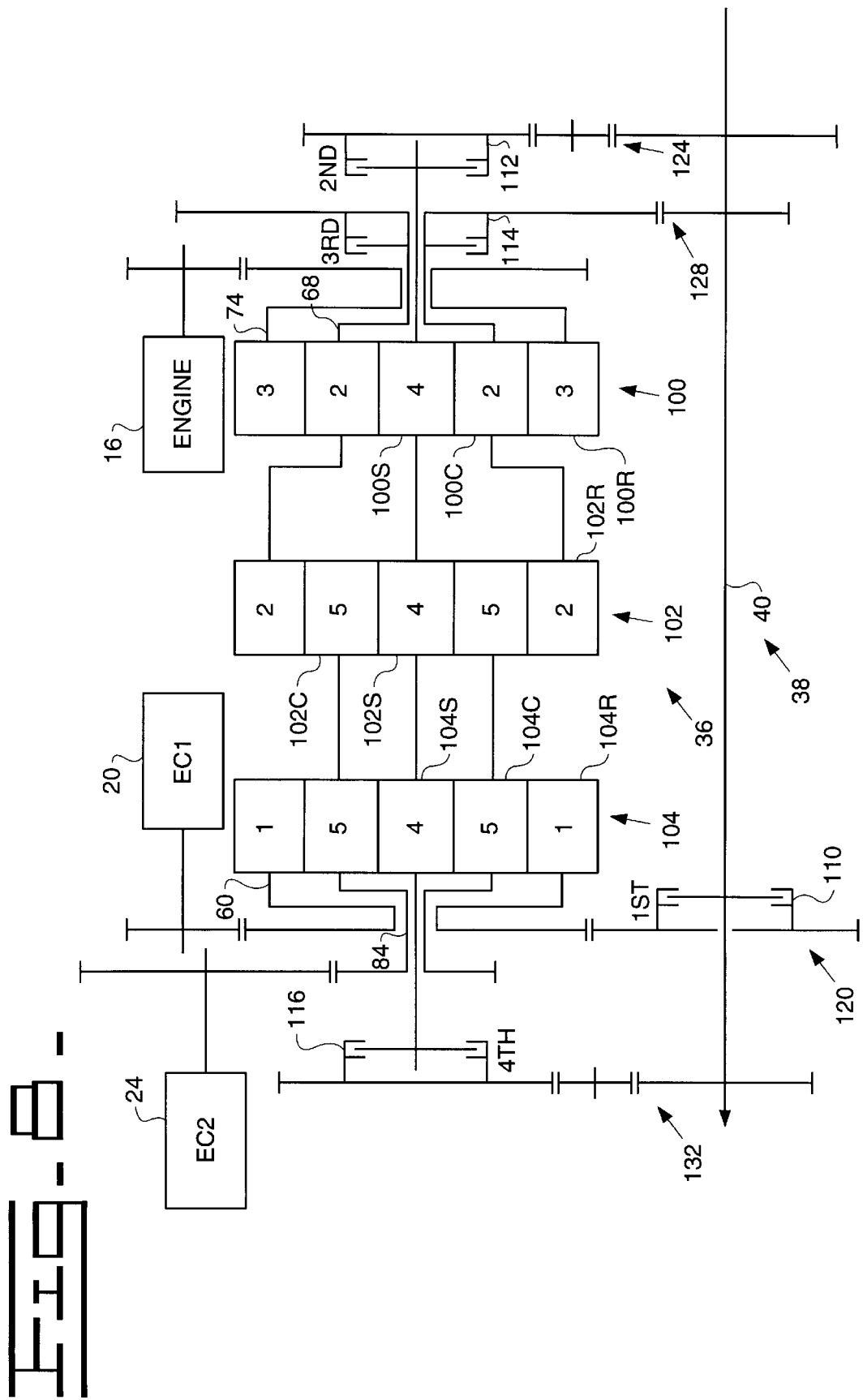
FIG. 8 is a schematic view of an alternate transmission arrangement.

Referring to FIG. 8, the first member 60 includes the ring gear 104R of the third planetary gear set 104. The first member is connected to the first motor/generator 20 and is selectively connectable to the output shaft 40 of the gear change mechanism 38 through the first clutch 110 and the gear train 120. The second member 68 includes the carrier 100C of the first planetary gear set 100 and the ring gear 102R of the second planetary gear set 102. The second member 68 is selectively connectable to the output shaft 40 of the gear change mechanism 38 through the third clutch and the gear train 128. The third member 74 includes the ring gear 100R of the first planetary gear set 100. The third member 74 is connected to the engine 16. The fourth member 80 includes the sun gears 100S,102S,104S of the first, second and third planetary gear sets 100,102,104. The fourth member is selectively connectable to the output shaft 40 through the second clutch 112 and the gear train 124. The fourth member is also selectively connectable to the output shaft 40 through the fourth clutch 116 and the gear train 132. The fifth member 84 includes the carriers 102C,104C of the second and third planetary gear sets 102,104. The fifth member 84 is connected to the second motor/generator 24.

Figure 9:
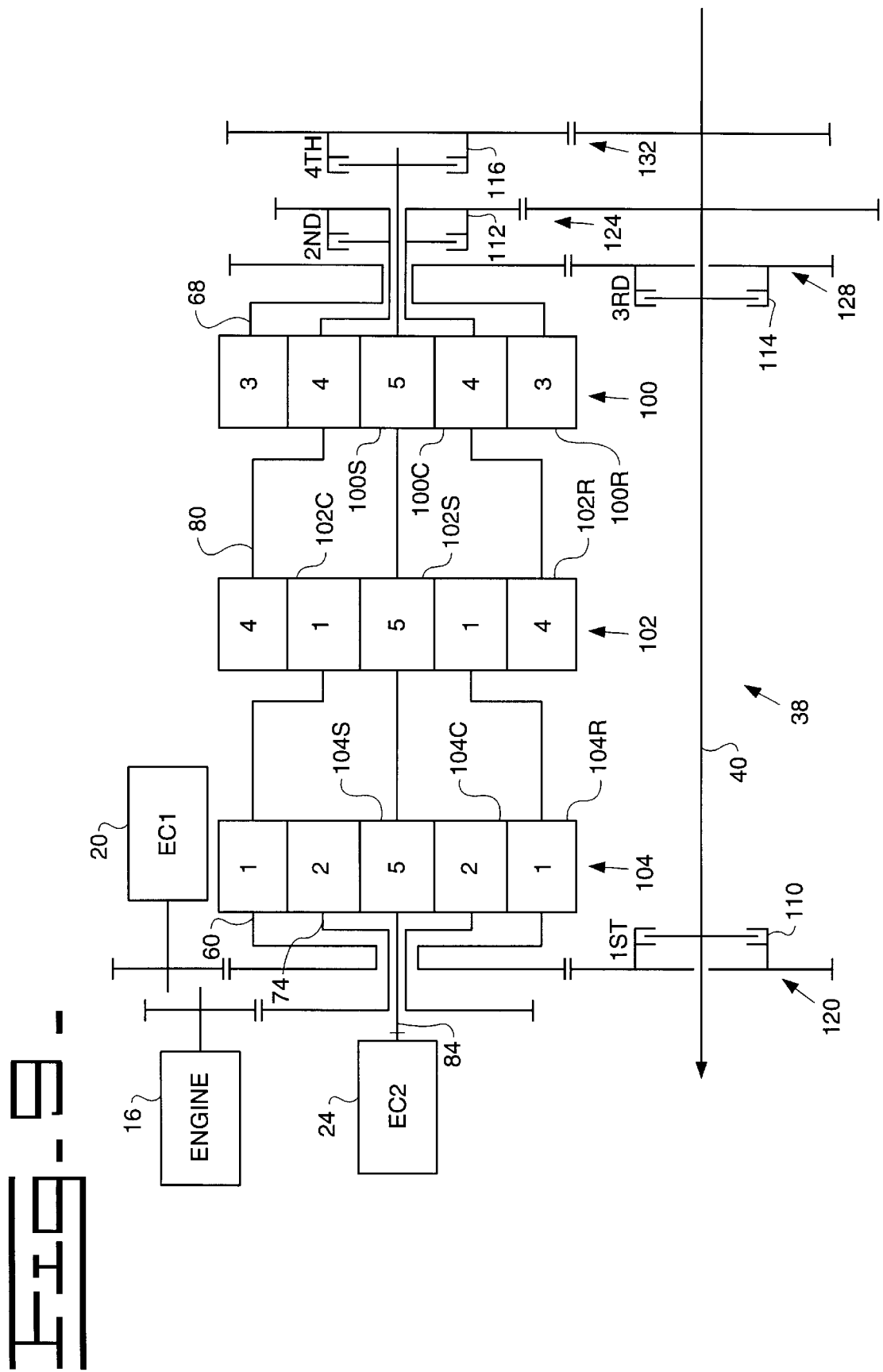
FIG. 9 is a schematic view of an alternate transmission arrangement.

Referring to FIG. 9, the first member 60 includes the carrier 102C of the second planetary gear set 102 and the ring gear 104R of the third planetary gear set 104. The first member 60 is connected to the first motor/generator 20 and is selectively connectable to the output shaft 40 of the gear change mechanism 38 through the first clutch 110 and the gear train 120. The second member 68 includes the ring gear 100R of the first planetary gear set 100. The second member 68 is selectively connectable to the output shaft 40 of the gear change mechanism 38 through the third clutch 114 and the gear train 128. The third member 74 includes the carrier 104C of the third planetary gear set 104. The third member 74 is connected to the engine 16. The fourth member 80 includes the carrier 100C of the first planetary gear set 100 and the ring gear 102R of the second planetary gear set 102. The fourth member 80 is selectively connectable to the output shaft 40 through the second clutch 112 and the gear train 124. The fourth member 80 is also selectively connectable to the output shaft 40 through the fourth clutch 116 and the gear train 132. The fifth member 84 includes the sun gears 100S,102S,104S of the first, second and third planetary gear sets 100,102,104. The fifth member 84 is connected to the second motor/generator 24.

Figure 10:
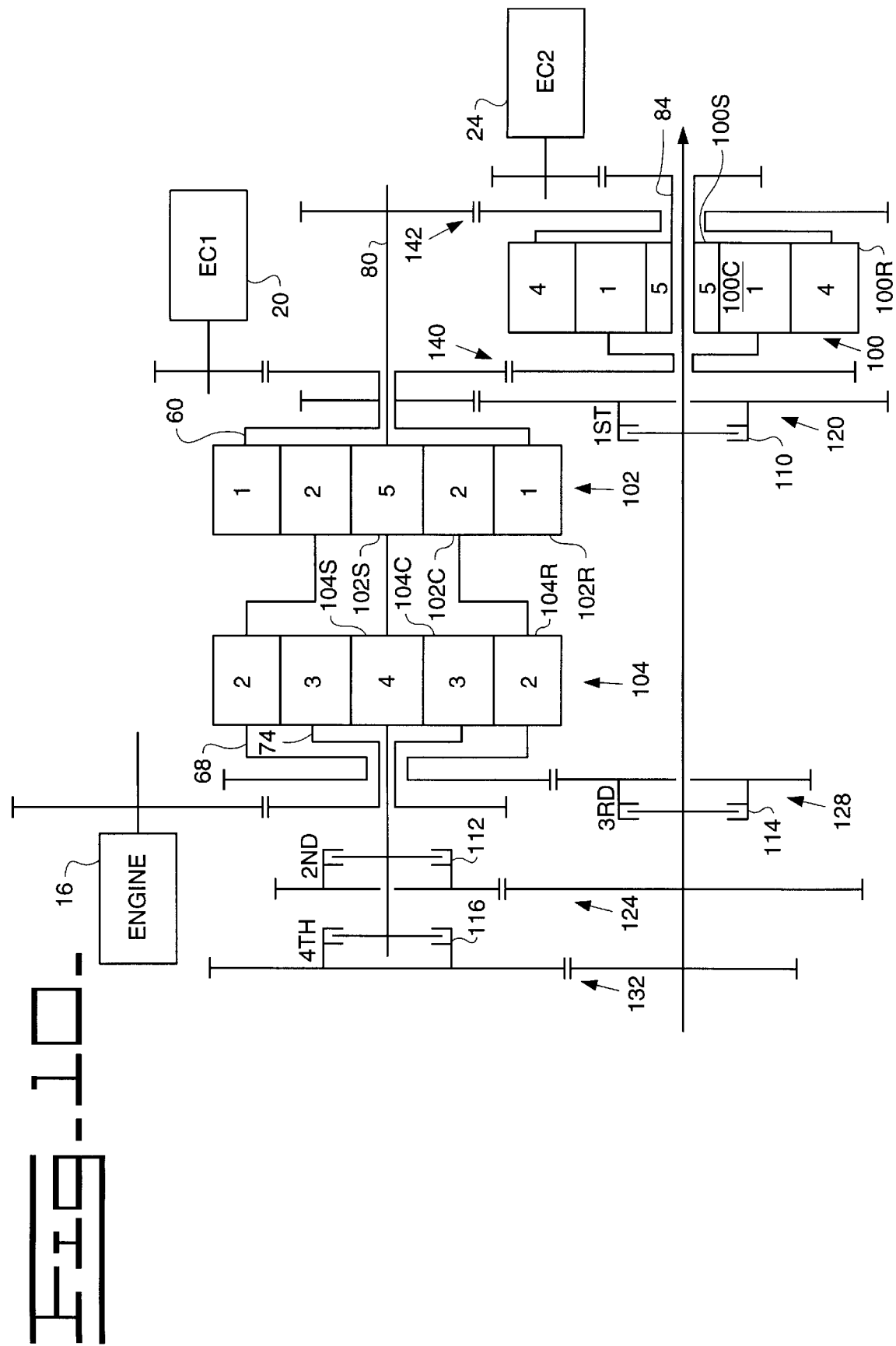
FIG. 10 is a schematic view of an alternate transmission arrangement.

Referring to FIG. 10, the first member 60 includes the carrier 100C of the first planetary gear set 100, the ring gear 102R of the second planetary gear set 102, and the gear train 140 positioned between the first and second planetary gear sets 100,102. The first member 60 is connected to the first motor/generator 20 and is also selectively connectable to the output shaft 40 of the gear change mechanism 38 through the first clutch 110 and the gear train 120. The second member 68 includes the carrier 102C of the second planetary gear set 102 and the ring gear 104R of the third planetary gear set 104. The second member 68 is selectively connectable to the output shaft 40 of the gear change mechanism through the third clutch 114 and the gear train 128. The third member 74 includes the carrier 104C of the third planetary gear set 104. The third member 74 is connected to the engine. The fourth member 80 includes the ring gear 100R of the first planetary gear set 100, the sun gears 102S,104S of the second and third planetary gear sets 102,104, and the gear train 142 positioned between the first and second planetary gear sets. The fourth member 80 is selectively connectable to the output shaft 40 through the second clutch 112 and the gear train 124. The fourth member 80 is also selectively connectable to the output shaft through the fourth clutch 116 and the gear train 132. The fifth member 84 includes the sun gear 100S of the first planetary gear set 100. The fifth member 84 is connected to the second motor/generator 24.

Figure 11:
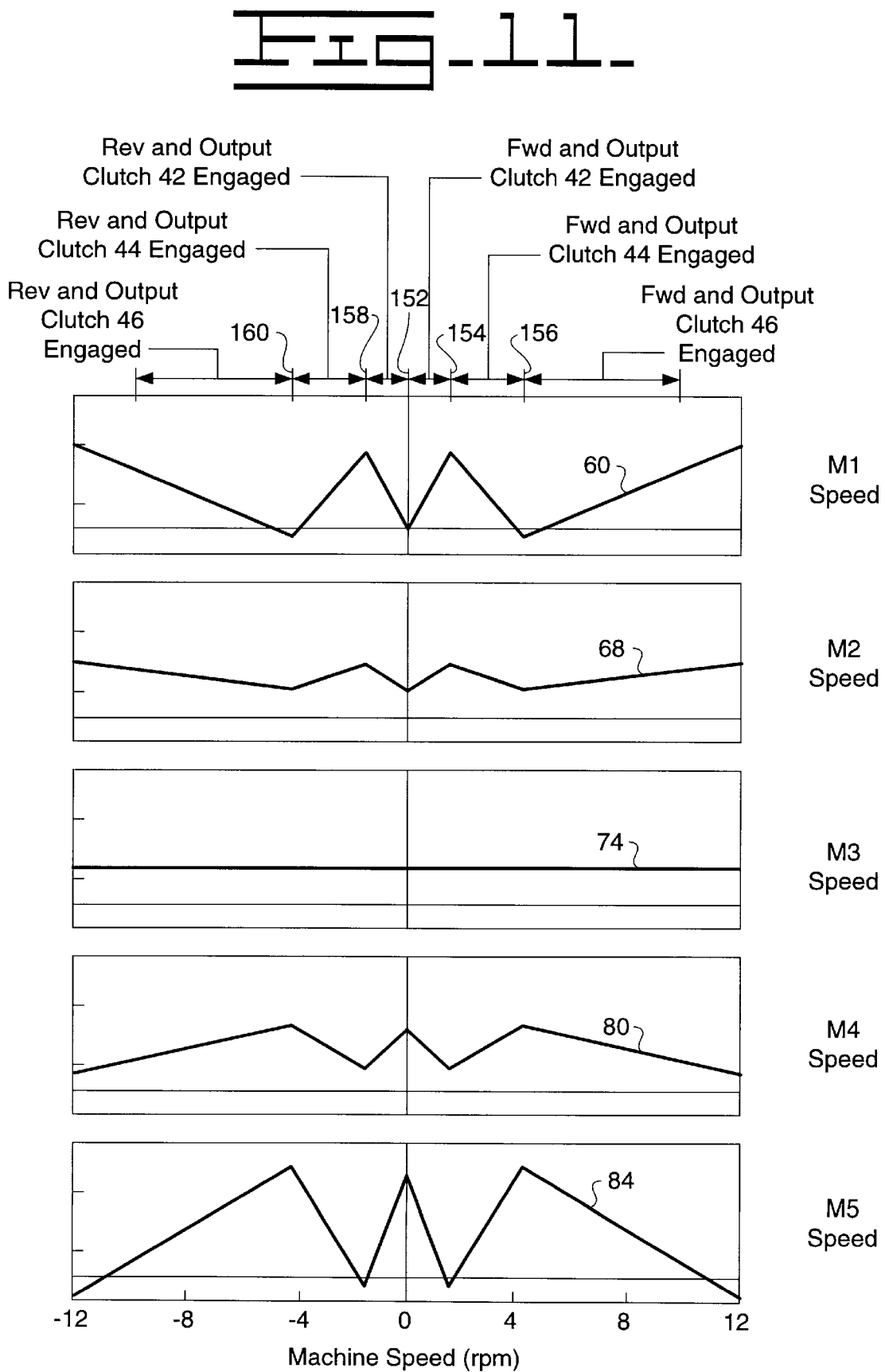
FIG. 11 is a schematic representation of a graph showing changes in the various components relative to machine speed.

Referring to FIG. 11, a graph 150 discloses the changes in the members and associated components as the machine speed from zero speed until maximum speed achieved in both forward and reverse. The graph 150 is shown as having three speed ratios. The transmission could have four or more speed ratios by adding more clutches and gear trains. The graph 150 shows the changes to the various members as shown in FIG. 1. Line 152 represents zero speed at which the clutch 42 is engaged, the clutches 44,46 are disengaged and the engine 16 and the motor/generators 20,24 maintain the machine at zero speed. From line 152 until line 154 the clutch 42 is engaged, the directional mechanism 41 is in the forward direction and the machine increases in speed. At line 154 the clutch 42 is disengaged and the clutch 44 is engaged to shift from the first gear ratio to the second gear ratio. At line 156 the clutch 44 is disengaged and the clutch 46 is engaged to shift from the second gear ratio to the third gear ratio. In the reverse direction the gear ratios will change at line 158 and line 160. A plurality of data lines 60,68,74,80, 84 on the graph 100 corresponds to the reference numerals of the five members. The data lines represent the speed and direction of the various members as the machine speed increases.

Industrial Applicability

In the use of the three speed ratio electro-mechanical transmission 10 of FIGS. 1–4, the electrical section 12 and the mechanical transmission 14 interact to provide a continuously variable and efficient output which enables the engine to operate at its best efficiency.

In operation of the electro-mechanical transmission 10 with the engine 16 and the connected third member 74 operating at a constant predetermined speed level the first clutch 42 is engaged to connect the first member to the output shaft 40 and the second and third clutches 44,46 are disengaged and the motor/generators 20,24 maintain the machine speed at zero. If the operator elects to move the machine in a forward direction, for example, from zero speed to approximately 1–2 mph, the first clutch 42 remains engaged for first gear ratio, the directional mechanism 41 is in the forward direction, the first member 60 and the first motor/generator 20 increases in speed, the second member 68 increases in speed, the fourth member decreases in speed and the fifth member 84 with the second motor/generator 24 decreases in speed.

At line 154, which is approximately 1–2 mph, the first clutch 42 is disengaged to disconnect the first member 60 from the output and the second clutch 44 is engaged, to achieve the second gear ratio, to connect the fourth member 80 to the output. The first member 60 with the first motor/generator 20 decreases in speed, the second member 68 decreases in speed, the fourth member 80 increases in speed, the fifth member 84 along with the second motor/generator 24 increase in speed.

At line 156, which is approximately 4 mph, the second clutch 44 is disengaged to disconnect the fourth member 80 from the output and the third clutch 46 is engaged, to achieve third gear ratio, to connected the second member 68 to the output. The first member 60 increases in speed, the second member 68 increases in speed, the fourth member 80 decreases in speed, the fifth member 84 decreases in speed. The members 60,68 will increase in speed and the members 80,84 will decrease in speed until the machine has reached its maximum speed.

It is recognized that the above graph and description relates to a three speed ratio electro-mechanical transmission, however the fourth clutch 116 could be used with the fourth member 80 to achieve a higher gear ratio. Additional clutches could also be used with the members to achieve higher gear ratios without departing from the scope of the invention. The speed of the machine will be increased from zero speed to some predetermined maximum speed level at a smooth continuous manner. This is accomplished by the interaction of the motor/generators and the mechanical transmission by engaging and disengaging the clutches.

In the subject arrangement the machine can be operated in the reverse direction through the same gear ratios as set forth above with respect to operating in the forward direction. To operate in the reverse the directional mechanism must be changed to the reverse direction.

In view of the forgoing, it is readily apparent that the electro-mechanical transmission of the present invention having five members and three planetary gear sets will provide a continuously variable transmission.

Other aspects, objects and advantages of this invention can be obtained from a study of the drawings, the disclosure and the appended claims.

We claim:

1. A electro-mechanical transmission having an input and a output, the electro-mechanical transmission comprising:
   a first motor/generator;
   a second motor/generator;
   a planetary gearing mechanism having a first member being connected to one of the motor/generators and being selectively connected to the output, a second member being selectively connected to the output, a third member being connected to the input, a fourth member being selectively connected to the output, and a fifth member being connected to the other of the motor/generator; and
   a gear change mechanism selectively connects the members of the planetary gearing mechanism to the output for achieving various ratios.

2. The electro-mechanical transmission of claim 1 wherein the planetary gearing mechanism includes a first planetary gear set, a second planetary gear set and a third planetary gear set, each of the planetary gear sets includes a sun gear, a carrier with planet gears and a ring gear.

3. The electro-mechanical transmission of claim 1 wherein the gear change mechanism selectively connects one of the first member, the second member and the fourth member to the output for changing gear ratios.

4. The electro-mechanical transmission of claim 2 wherein the first member includes the ring gears of the first and second planetary gear sets.

5. The electro-mechanical transmission of claim 2 wherein the second member includes the carrier of the first planetary gear set.

6. The electro-mechanical transmission of claim 2 wherein the third member includes the carrier of the second planetary gear set and the ring gear of the third planetary gear set.

7. The electro-mechanical transmission of claim 2 wherein the fourth member includes the carrier of the third planetary gear set.

8. The electro-mechanical transmission of claim 2 wherein the fifth member includes the sun gears of the first, second, and third planetary gear sets.

9. The electro-mechanical transmission of claim 3 wherein the gear change mechanism includes a first clutch engageable to selectively connect the first member to the output for achieving a first gear ratio.

10. The electro-mechanical transmission of claim 3 wherein the gear change mechanism includes a second clutch engageable to selectively connect the fourth member to the output for achieving a second gear ratio.

11. The electro-mechanical transmission of claim 3 wherein the gear change mechanism includes a third clutch engageable to selectively connect the second member to the output for achieving a third gear ratio.

12. The electro-mechanical transmission of claim 3 wherein the gear change mechanism includes a fourth clutch engageable to selectively connect the fourth member to the output for achieving a fourth gear ratio.

13. The electro-mechanical transmission of claim 2 wherein the first member includes the ring gear of the first planetary gear set, the second member includes the carrier of the first planetary gear set and the ring gear of the second planetary, the third member includes the carrier of the second planetary gear set and the ring gear of the third planetary gear set, the fourth member includes the carrier of the third planetary gear set, the fifth member includes the sun gears of the first, second and third planetary gear sets.

14. The electro-mechanical transmission of claim 2 wherein the first member includes the carrier of the first planetary gear set and the ring gear of the second planetary gear set, the second member includes the ring gear of the third planetary gear set, the third member includes the ring gear of the first planetary gear set and the carriers of the second and third planetary gear sets, the fourth member includes the sun gears of the second and third planetary gear sets, the fifth member includes the sun gear of the first planetary gear set.

15. The electro-mechanical transmission of claim 2 wherein the first member includes the ring gear of the first planetary gear set, the second member includes the carrier of the first planetary gear set and the ring gear of the second planetary gear set, the third member includes the ring gear of the third planetary gear set, the fourth member includes the carriers of the second and third planetary gear sets, the fifth member includes the sun gears of the first, second and third planetary gear sets.

16. The electro-mechanical transmission of claim 2 wherein the first member includes the ring gears of the first and second planetary gear sets, the second member includes the carrier of the first planetary gear set, the third member includes the carrier of the second planetary gear set and the ring gear of the third planetary gear set, the fourth member includes the carrier of the third planetary gear set, the fifth member includes the sun gears of the first, second and third planetary gear sets.

17. The electro-mechanical transmission of claim 2 wherein the first member includes the ring gear of the first planetary gear set, the second member includes the ring gear of the second planetary gear set and the carrier of the third planetary gear set, the third member includes the ring gear of the third planetary gear set, the fourth member includes the sun gears of the first, second and third planetary gear sets, the fifth member includes the carriers of the first and second planetary gear sets.

18. The electro-mechanical transmission of claim 2 wherein the first member includes the ring gear of the first planetary gear set and the carrier of the second planetary gear set, the second member includes the ring gear of the third planetary gear set, the third member includes the carrier of the first planetary gear set, the fourth member includes the ring gear of the second planetary gear set and the carrier of the third planetary gear set, the fifth member includes the sun gears of the first, second and third planetary gear sets.

19. The electro-mechanical transmission of claim 2 wherein the first member includes the ring gear of the first planetary gear set, the second member includes the carrier of the first planetary gear set and the ring gear of the second planetary gear set, the third member includes the ring gear of the third planetary gear set, the fourth member includes the sun gear of the first planetary gear set and the carriers of the second and third planetary gear sets, the fifth member includes the sun gears of the second and third planetary gear sets.

20. The electro-mechanical transmission of claim 2 wherein the first member includes the ring gear of the second planetary gear set and the carrier of the third planetary gear set, the second member includes the ring gear of the first planetary gear set and the carrier of the second planetary gear set, the third member includes the carrier of the first planetary gear set, the fourth member includes the sun gears of the first and second planetary gear sets and the ring gear of the third planetary gear set, the fifth member includes the sun gear of the third planetary gear set.

* * * * *